No. 866,901. PATENTED SEPT. 24, 1907.
P. O. ZEHNER.
STEERING DEVICE.
APPLICATION FILED MAR. 11, 1907.
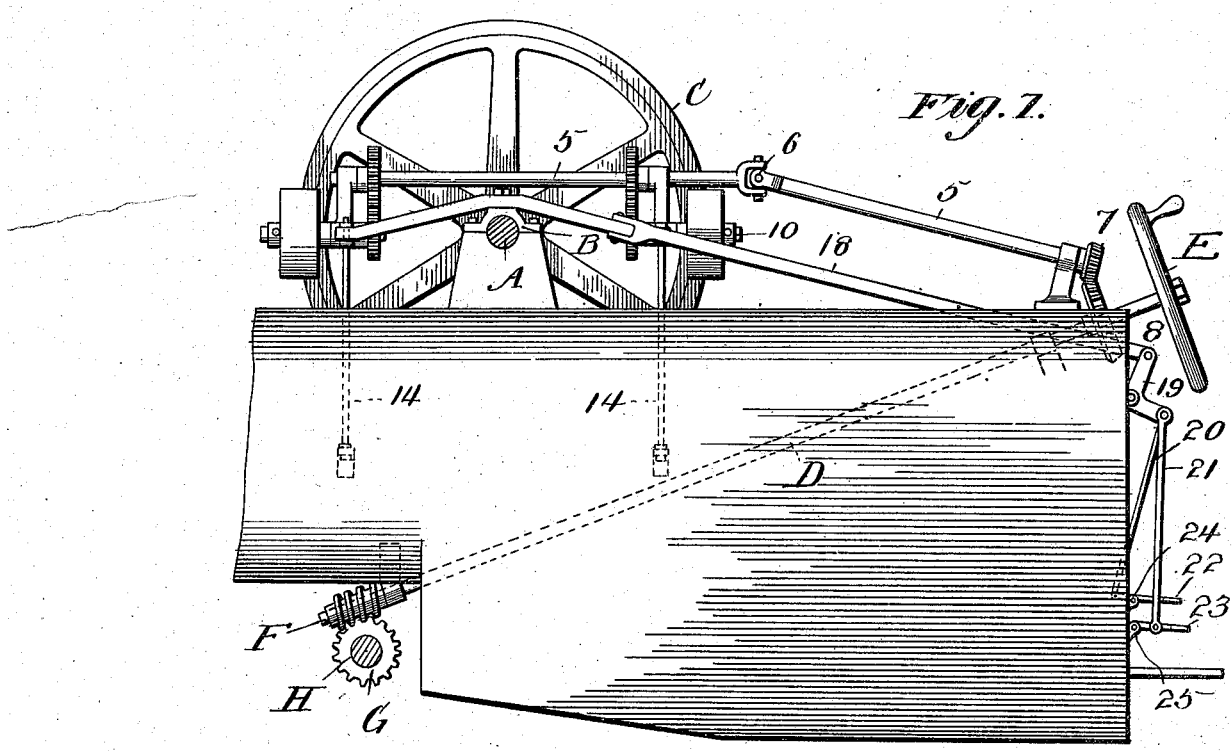
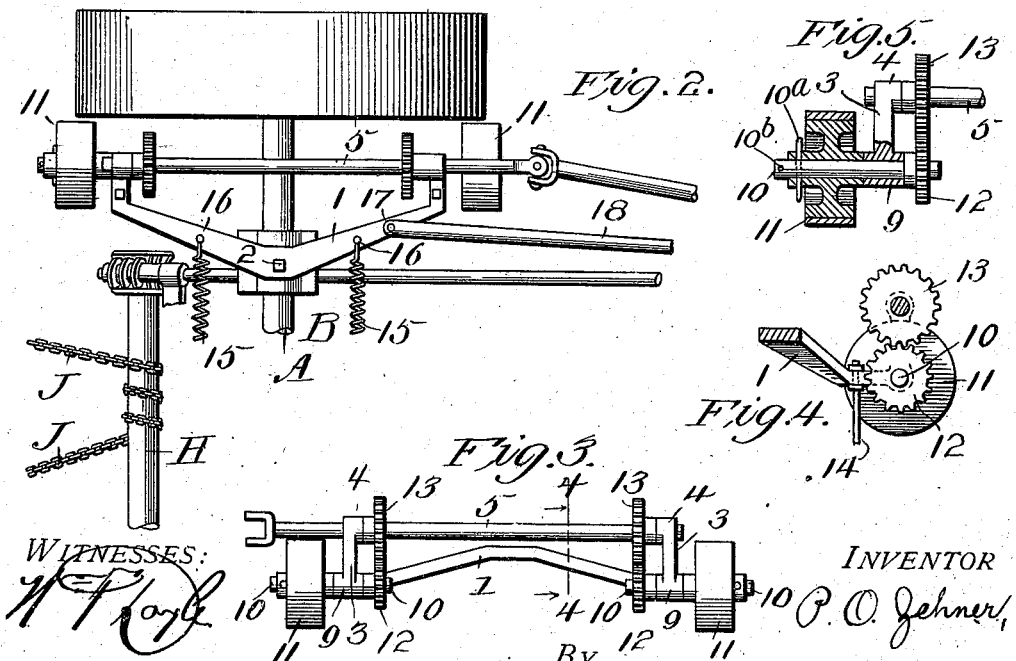
WITNESSES:
INVENTOR
P. O. Zehner,
By C. L. Parker
Attorney

UNITED STATES PATENT OFFICE.

PERRY O. ZEHNER, OF TANK, PENNSYLVANIA.

STEERING DEVICE.

No. 866,901.  Specification of Letters Patent.  Patented Sept. 24, 1907.

Application filed March 11, 1907. Serial No. 361,772.

*To all whom it may concern:*

Be it known that PERRY O. ZEHNER, a citizen of the United States, residing at Tank, in the county of Luzerne and State of Pennsylvania, has invented certain new and useful Improvements in Steering Devices, of which the following is a specification.

My invention relates to traction engines and machines of like character, and specifically resides in the provision of a steering mechanism which may be manually operated as heretofore, and which may be, when so desired, frictionally, or otherwise connected with the driving mechanism in order that the steering of the engine may be accomplished thereby.

My invention further consists in the features of construction, arrangement and combination, as will be hereinafter described with reference to the accompanying drawings, in which Figure 1 is an elevation of my improved mechanism. Fig. 2 is a plan view of a portion thereof. Fig. 3 is a side elevation of the oscillating frame and the friction wheels carried thereby. Fig. 4 is a section on the line 4—4 of Fig. 3, looking in the direction of the arrow, and Fig. 5 is an elevation of one of the clutching devices showing the friction wheel in section.
Referring to the figures, A represents the engine driving shaft, mounted through the bearings B and provided with a fly-wheel C at the end thereof.

D represents the steering shaft, provided with the ordinary hand-wheel E at the upper end thereof, and provided at its lower end with a worm F, meshing with the worm gear G, mounted on the roll shaft H, by which means said steering shaft D rotates said roll shaft to operate the front axle of the machine by means of the steering chains J.
The mechanism as described is universally used on traction engines and analogous machines as a means of steering the same. In the practical embodiment of my invention however, I provide an oscillating U-shaped frame 1, pivotally mounted at 2 on the bearing B of the driving shaft A, and integrally united with the supporting brackets 3, having bearings 4 at the upper end thereof, for the reception of the power shaft 5, provided with a universal connection 6 therein and driving the steering shaft by means of the gears 7 and 8, mounted respectively on said power shaft, and the steering shaft D. The brackets 3 are provided with bearings 9 at their lower ends, carrying the short shafts 10, which have arranged thereon outside of said brackets 3 the friction wheels 11, either of which are adapted to be frictionally engaged with the peripheral edge of the fly-wheel C upon the oscillation of the frame 1.

I preferably arrange the friction wheels 11 as either driving members when the machine is on the road, or as idlers when using the engine stationary, in order to prevent the belt from slipping off inside the fly wheel C.

To accomplish this I provide a pin $10^a$ which may either be inserted through an opening in the central sleeve of the wheel 11 and through a registering transverse opening in the short shaft 10 when used as a driving wheel as shown clearly in Fig. 5, or said pin $10^a$ may be withdrawn from this position and inserted through a transverse slot $10^b$ in the short shaft 10 outside the sleeve of wheel 11 when it is desired to utilize the same as idlers as described. Thus it will be seen that when the U-shaped frame 1 is oscillated to throw either of the friction wheels 11 into engagement with the peripheral edge of the fly-wheel C, power will be transmitted to the power shaft 5, through the short shaft 10 and gears 12 and 13, and said power shaft 5 will in turn drive the steering shaft D by means of the gears 7 and 8, as described.

The oscillating frame 1 and its associated parts are preferably supported by means of the upright rods 14, extending from a suitable part of the machine, and of a sufficient length to be slightly elastic in allowing of the oscillation of said frame 1. Springs 15 are connected at 16 to the frame 1, and normally tend to hold the power mechanism in the position shown in Fig. 2 (unclutched).

The means for oscillating the U-shaped frame 1 are as follows: Connected to said frame at 17 is an operating rod 18 connected at its other end to the end of the upright arm of a bell-crank lever 19, which has connected at its other end treadle rods 20 and 21 connected respectively to the foot treadles 22 and 23. The treadle 22 is pivoted midway of its ends to a bracket 24, and is connected at its extreme end to said treadle rod 20, while the treadle 23 is pivotally mounted at its extreme end in the bracket 25, and its treadle rod 21 is connected thereto intermediate its ends. Thus it will be seen that when the treadle 23 is depressed the bell-crank lever 19 will be swung downwardly, pulling on the operating rod 18, thus oscillating the frame 1 slightly to frictionally clutch the wheel 11 farthest away from the same, and consequently set in motion the mechanism to turn the front wheels in one direction, while should the treadle 22 be depressed, the rod 20 will swing the bell-crank lever 19 upwardly, thus pushing on the rod 18 to frictionally clutch the near wheel 11, and turn the machine in the reverse direction.

Having fully described my invention I claim:

1. In a steering mechanism for traction engines and the like, the combination with a manually operable steering shaft, a power shaft arranged to operate said steering shaft, an oscillating frame mounted adjacent the fly wheel of the driving mechanism of said engine, friction wheels mounted in said frame and adapted to be engaged and disengaged with the peripheral edge of said fly wheel, gearing arranged between said friction wheels and said power shaft, and means for oscillating said frame to frictionally clutch one of said wheels, substantially as described.

2. In a steering mechanism for traction engines and the like the combination with a manually operable steering shaft, a power shaft arranged to operate said steering shaft, an oscillating frame mounted adjacent the fly wheel of the driving mechanism of said engine, friction wheels mounted in said frame and adapted to be engaged and disengaged with the peripheral edge of said fly wheel, gearing arranged between said friction wheels and said power shaft, means for oscillating said frame to frictionally engage one of said wheels and removable locking means for locking said wheels in said frame, whereby they may be released and used as idlers to prevent the belt slipping off said fly wheel when said engine is working stationary, substantially as described.

3. In a steering mechanism for traction engines and the like, the combination with a manually operable steering shaft, a power shaft arranged to operate said steering shaft, an oscillating frame mounted adjacent the fly wheel of the driving mechanism of said engine, friction wheels mounted in said frame, and adapted to be engaged and disengaged with the peripheral edge of said fly wheel, gearing arranged between said friction wheels and said power shaft, treadle operated means for oscillating said frame to frictionally clutch one of said wheels and removable locking means for locking said wheels in said frame, whereby they may be released and used as idlers to prevent the belt slipping off said fly wheel when said engine is working stationary, substantially as described.

4. In a steering mechanism for traction engines and the like, the combination with a manually operable steering shaft, a power shaft arranged to operate said steering shaft, an oscillating frame mounted adjacent the fly wheel of the driving mechanism of said engine, friction wheels mounted in said frame, and adapted to be engaged and disengaged with the peripheral edge of said fly wheel, gearing arranged between said friction wheels and said power shaft, and treadle operated means for oscillating said frame to frictionally clutch one of said wheels, substantially as described.

5. In a steering mechanism for traction engines and the like, the combination with a manually operable steering shaft, a power shaft arranged to operate said steering shaft, an oscillating frame mounted adjacent the fly wheel of the driving mechanism of said engine, a pair of short shafts mounted in said frame, friction wheels mounted on said short shafts and adapted to be engaged and disengaged with the peripheral edge of said fly wheel, gearing arranged between said short shafts and said power shaft, and means for oscillating said frame to frictionally clutch one of said wheels, substantially as described.

6. In a steering mechanism for traction engines and the like, the combination with a manually operable steering shaft, a power shaft arranged to operate said steering shaft, an oscillating frame mounted adjacent the fly wheel of the driving mechanism of said engine, a pair of short shafts mounted in said frame, friction wheels mounted on said short shafts and adapted to be engaged and disengaged with the peripheral edge of said fly wheel, means for normally holding said wheels disengaged, gearing arranged between said short shafts and said power shaft, and means for oscillating said frame to frictionally engage one of said wheels, substantially as described.

7. In a steering mechanism for traction engines and the like, the combination with a manually operable steering shaft, a power shaft arranged to operate said steering shaft, an oscillating frame mounted adjacent the fly wheel of the driving mechanism of the engine, a pair of short shafts mounted in said frame, friction wheels mounted on said short shafts, and adapted to be engaged and disengaged with the peripheral edge of said fly wheel, means for tightly or loosely mounting said friction wheels, gearing arranged between said short shafts and said power shaft, and means for oscillatng said frame to frictionally engage one of said wheels, substantially as described.

8. In a steering mechanism for traction engines and the like, the combination with a manually operable steering shaft, a power shaft arranged to operate said steering shaft, an oscillating frame mounted adjacent the fly wheel of the driving mechanism of the engine, a pair of short shafts mounted in said frame, friction wheels mounted on said short shafts, gearing arranged between said short shafts and said power shaft, means for oscillating said frame to frictionally engage one of said wheels, and removable locking means for locking said wheels to said short shafts, whereby they may be released and used as idlers to prevent the belt slipping off said fly wheel when the engine is working stationary, substantially as described.

In testimony whereof I affix my signature in presence of two witnesses.

PERRY O. ZEHNER.

Witnesses:
THEODORE BLOCK,
C. L. PARKER.